July 22, 1958 — C. I. EVERETT — 2,844,253
MEANS AND METHOD FOR SEPARATING HONEY AND WAX FROM A HONEY-WAX MIXTURE
Filed May 16, 1955 — 2 Sheets-Sheet 1

CHARLES IRVING EVERETT,
INVENTOR.

BY
ATTORNEY

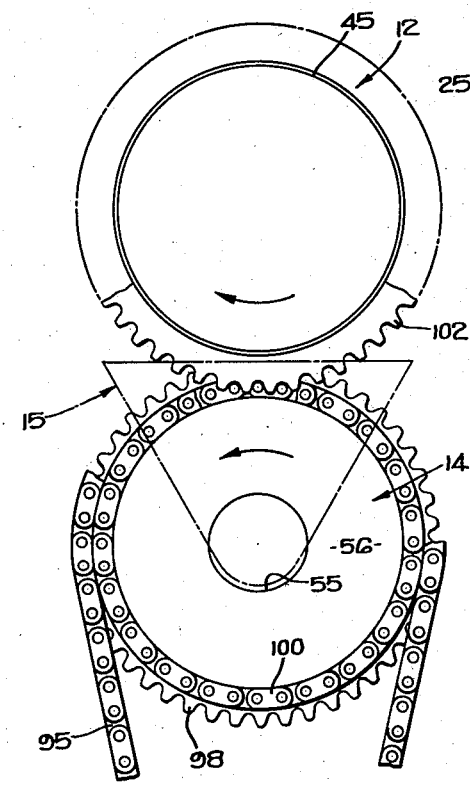
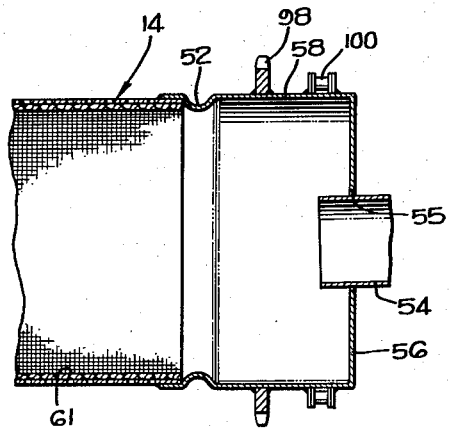
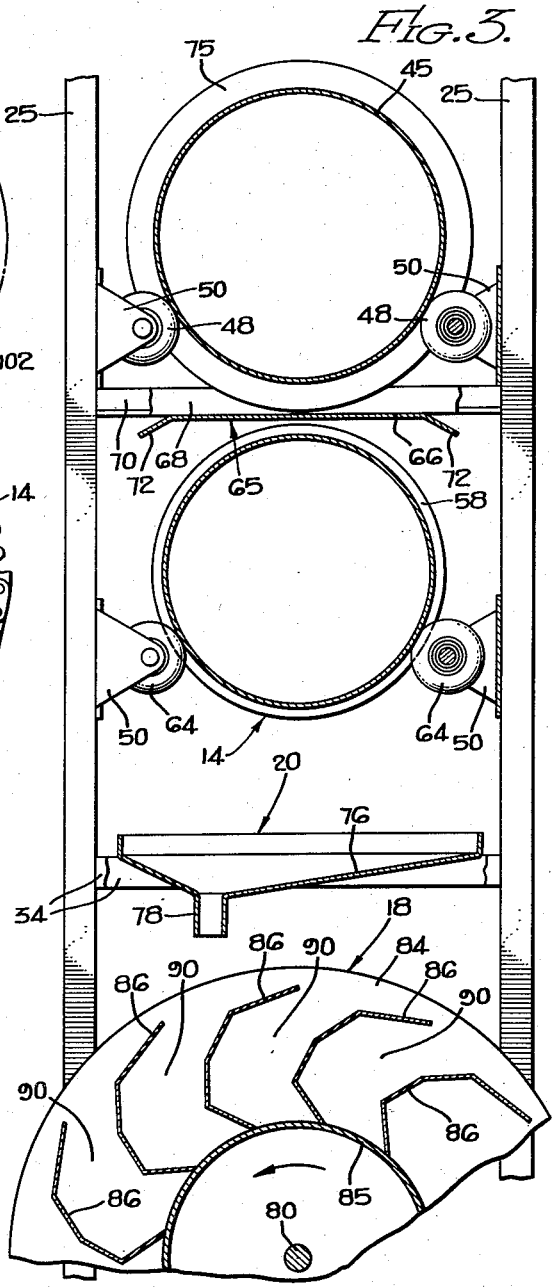

United States Patent Office 2,844,253
Patented July 22, 1958

2,844,253

MEANS AND METHOD FOR SEPARATING HONEY AND WAX FROM A HONEY-WAX MIXTURE

Charles I. Everett, Wellington, Nev.

Application May 16, 1955, Serial No. 508,605

12 Claims. (Cl. 210—77)

This invention relates to a means and method for separating honey and wax from a honey-wax mixture with special reference to a mixture of the general character of the output of a conventional honey extractor.

The output from a honey extractor contains a minor portion of wax in the form of relatively small pieces and particles. One method of separating the wax from the honey is to let a batch of the mixture stand in a suitable receptacle to permit the wax to accumulate on the surface of the batch and then to skim off the wax. This method involves considerable handling labor and is relatively slow since time is required for the wax to rise to the surface of a batch. Another method that has been employed heretofore is simply to pour the honey through suitable screen means. Here again considerable labor is involved in handling the material and a further disadvantage is that the wax particles tend to clog the screen and must be continually removed from the screen.

The broad object of the present invention is to provide a more efficient, more expeditious, and more economical method of separating the wax from the honey. The attainment of the object is based on a number of discoveries.

One discovery is that if a quantity of such a mixture is placed in a slowly rotating hollow screen means that extends in a generally horizontal direction, the wax content of the mixture forms a cylindrical body of substantially less diameter than the inside diameter of the rotary screen means. Because of the difference in diameter, the roll-shaped wax body rotates on its own axis faster than the rotary screen means and such rotation creates a kneading action that expresses the honey out of the wax body. The separated honey drains through the wall of the rotary screen means and the wax-honey ratio of the rotating roll-shaped body progressively increases, the operation being continued until this ratio reaches a satisfactory magnitude.

A second discovery is that the rotating wax body is adhesive enough to pick up any loose particles of wax that may be trapped by the rotary screen. Thus, the rotary screen is operated in a self-cleaning manner.

A third discovery is that such a rotary screen means may be slightly inclined to cause the rotating wax body to gravitate progressively towards the lower end of the rotary screen. For this purpose the rotary screen means may be in the form of a cylinder with its axis inclined or may be in the form of a conically curved rotary screen means positioned with its axis substantially horizontal. Either arrangement provides an inclined rotary screen surface that causes the rotating wax body to progress gravitationally along its own axis with the constituent parts of the roll-shaped body moving in spiral paths towards the discharge end of the rotary screen.

Since the wax-honey ration of the roll-shaped body progressively increases as it gravitates longitudinally it is merely necessary to provide a sufficiently long rotary screen means or a series of such screen means of sufficient total length to permit the wax-honey ratio to reach the desired end value. It is apparent that this discovery may be applied to a continuous process in which the honey-wax mixture is continually fed into one end of a rotary screen means or a series of rotary screen means in tandem and the wax is continually discharged from the other end.

While the rotary screen means or series of rotary screen means may be rotated manually, a further object of the preferred practice of the invention is to provide a simple, efficient and inexpensive means to actuate the rotary screen means. In this regard the preferred practice of the invention is based on a fourth discovery that the initial honey-wax ratio of such a mixture from an extractor is so high that the gravitational flow of the separated honey provides adequate power to rotate the screen means. Thus, the separated honey may operate a paddle wheel, bucket wheel or the like that is operatively connected to the rotary screen means.

A further object of the invention is to provide a simple and efficient apparatus of the character described that may be quickly and easily cleaned after each production run.

The various objects, features and advantages of the invention will be apparent from the following detailed description considered with the accompanying drawings:

In the drawings, which are to be regarded as merely illustrative:

Fig. 2 shows a portion of the driving mechanism as viewed along the line 2—2 of Fig. 1;

Fig. 3 is a transverse section taken as indicated by the angular line 3—3 of Fig. 1; and Fig. 4 is a section view of the input end of the lower rotary screen of the apparatus.

Figure 1:
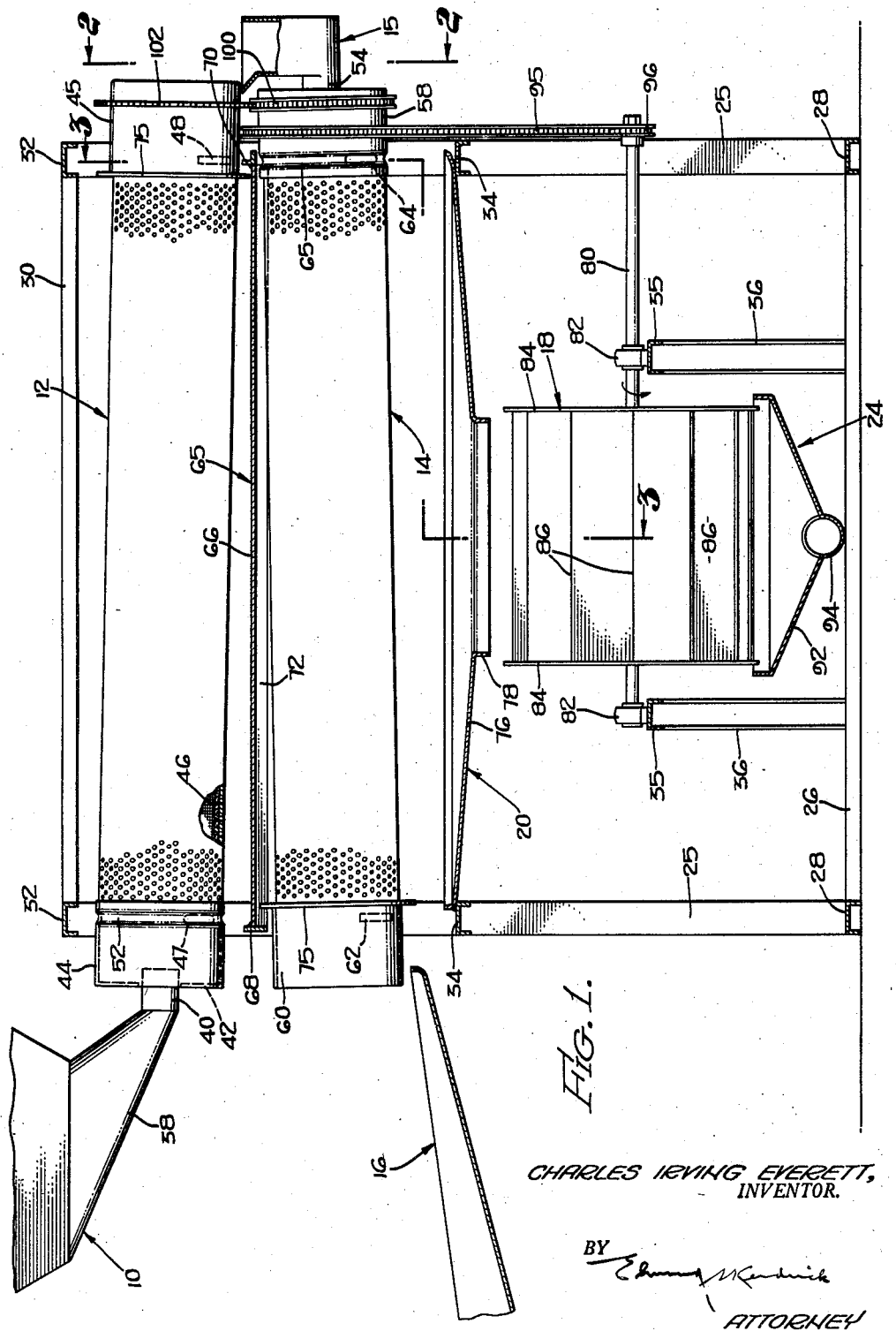
Fig. 1 shows the selected embodiment of the invention partly in side elevation and partly in section.

The principal parts of the selected embodiment of the invention shown in the drawings include: a feed hopper 10 to receive the honey-wax mixture; a slightly inclined upper cylindrical screen 12 with its upper end positioned to receive the initial mixture from the feed hopper; a similar lower cylindrical screen 14 inclined in the opposite direction; a transfer hopper 15 to receive the wax discharge from the upper screen and to feed the wax to the elevated end of the lower screen; a suitable receptable means or discharge chute 16 to receive the final wax output from the lower cylindrical screen 14; a rotary actuator in the form of a bucket wheel 18 for driving the two rotary screens 12 and 14 by gravitational movement of the separated honey; a lower drip pan 20 to direct the separated honey into the bucket wheel; and an upper drip pan or shield 22 to direct the honey draining from the upper cylindrical screen 12 into the lower drip pan 20; and receptable means 24 to receive the clarified honey from the bucket wheel 18.

The particular form of the apparatus shown in the drawings has a framework largely made of channel iron including four upright corner members 25. The corner members 25 are interconnected at their bottom ends by longitudinal members 26 and transverse members 28 and are interconnected at their upper ends by longitudinal members 30 and transverse members 32. In addition the two corner members 25 at each end of the apparatus are interconnected by transverse member 34 at an intermediate level. The framework further includes a pair of transverse horizontal members 35 to support the bucket wheel 18, these transverse members being carried by four legs 36 extending upward from the lower longitudinal members 26.

The feed hopper 10 has a downwardly tapering bottom 38 that terminates in a substantially horizontal discharge spout 40 of restricted cross-sectional dimension. By virtue of this arrangement a supply quantity of the honey-wax mixture in the feed hopper 10 will be discharged at a steady and suitably retarded rate into the upper end of the upper rotary screen 12. Preferably the upper end of the upper rotary screen 12 is closed by an end wall 42 which is apertured in the center to receive and clear the discharge spout 40.

The upper rotary screen 12 comprises a sheet metal cylinder that is perforate throughout the major portion of its length but has an imperforate upper end portion 44 and a similar imperforate lower end portion 45. The interior of the perforated cylinder is lined with woven screen material or hardware cloth 46. A feature of the invention is that the rotary screen 12 simply rests on a forward pair of rollers 47 and a similar rearward pair of rollers 48 so that it is a simple matter to lift the rotary screen out of the apparatus for cleaning whenever desired.

The rollers 47 and 48 are mounted by suitable anti-friction bearings in suitable support brackets 50 that, in turn, are mounted on the upright corner members 25. Preferably the rotary screen 12 is engaged by at least one of the two pairs of rollers in such manner as to prevent longitudinal shifting of the rotary screen. For this purpose the imperforate upper end portion 44 may be formed with a circumferential groove 52 in which the forward pair of rollers 47 track. The rearward pair of rollers 48 are in supporting contact with the imperforate lower end portion 45 of the rotary screen.

The transfer hopper 15 is positioned under the lower open end of the upper rotary screen 12 and is suitably supported by the framework of the apparatus in fixed position to feed the lower rotary screen 14. The transfer hopper 15 may be formed with a suitable discharge spout 54 and, as best shown in Fig. 4, this discharge spout may extend through a central aperture 55 in an end wall 56 that closes the upper rear end of the lower rotary screen 14.

The lower rotary screen 14 which is of the same general construction as the upper rotary screen, comprises a sheet metal cylinder that is perforate throughout the major portion of its length and has an upper imperforate end portion 58 and a lower imperforate end portion 60. As shown in Fig. 4, the cylinder has a liner 61 of hardware cloth. In the manner heretofore described, the lower rotary screen 14 is supported on a forward pair of rollers 62 and rearward pair of rollers 64. As before described, these rollers are provided with anti-friction bearings and are carried by support brackets 50. The forward pair of rollers 62 make supporting contact with the lower imperforate end portion 60 of the rotary screen and the rearward pair of rollers 64 track in a circumferential groove in the upper imperforate end portion 58 of the rotary screen. The lower front end of the rotary screen 14 is open and overhangs the receptacle means 16 for discharge of the final wax product into the receptacle means. Here again, the lower rotary screen 14 may be readily lifted from the rollers 62 and 64 for removal from the apparatus when desired.

The upper drip pan or shield 65 for receiving honey drippage from the upper rotary screen 12 comprises a horizontal plate 66 united with a cross bar 68 at its forward end and united with an angle iron 70 at its rearward end, the cross bar and angle iron being welded to the corresponding upright corner frame members 25 and serving as end walls for the drip pan. This upper drip pan 62 does not have side walls and preferably the longitudinal margins of the horizontal plate 66 are bent downward to form inclined drip edges 72 as shown in Fig. 3. It will be noted that the drip edges 72 overhang the lower rotary screen 14 so that drippage therefrom clears the rotary screen to fall directly into the lower drip pan 20.

There is a certain tendency for honey clinging to the outer periphery of the upper rotary screen 12 to migrate towards the lower end of the screen onto the lower imperforate end portion 45, but this tendency may be met by a peripheral baffle ring 74 that is mounted on the rotary screen adjacent the imperforate end portion 45, this baffle ring being directly above the upper drip pan 22. In like manner, the lower rotary screen 12 is provided with an outer peripheral baffle ring 75 adjacent its lower imperforate end portion 60 to keep honey that clings to the periphery of the rotary screen from flowing onto the imperforate end portion 60 and to cause the honey to be deflected onto the lower drip pan 20.

The lower drip pan 20, which may rest on the transverse frame members 34 in a removable manner, has a bottom 76 which slopes from all sides to a discharge spout 78 that is of elongated rectangular cross-sectional configuration. This discharge spout 78 is in a central position with respect to the rotary actuator 18 and is slightly shorter than the length of the rotary actuator as may be seen in Fig. 1. The location of the discharge spout 78 relative to the rotary actuator is such as to drop the clarified honey into the proper region for causing the rotary actuator to operate.

The rotary actuator 18 may be mounted on a suitable drive shaft 80 that is journaled in suitable bearings 82 on the previously mentioned transverse frame members 35. The rotary actuator 18 is preferably in the form of a bucket wheel that receives increments of the clarified honey and is rotated by the weight of the successive increments. In the construction shown, the bucket wheel 18 has two circular end walls 84 interconnected by a cylindrical wall 85 and the various buckets are formed by bent angular plates 86 attached to the two end walls and to the cylindrical wall. As may be seen in Fig. 3, this arrangement provides a circular series of receptacles or buckets 90 positioned to catch the drippage from the lower drip pan 20. The honey caught by each of the buckets is trapped therein until the bucket reaches the lower region of the wheel to dump into the receptacle means 24. The receptacle means 24 may be in the form of a hopper 92 as shown, the hopper draining into a suitable discharge conduit 94.

Any suitable arrangement may be provided for operating the two rotary screens 12 and 14 from the drive shaft 80. In the present embodiment of the invention a suitable sprocket chain 95 (Fig. 1) connects a drive sprocket 96 on the drive shaft 80 with a larger sprocket 98 (Fig. 2) that is mounted concentrically on the periphery of the imperforate end portion 58 of the lower rotary screen 14. The upper rotary screen 12 is operatively connected with the lower rotary screen 14 by means of a sprocket chain ring 100 that is welded onto the periphery of the lower rotary screen 14, the upper rotary screen 12 having a concentric peripheral sprocket 102 fixedly mounted thereon in mesh with sprocket chain ring.

The manner in which the apparatus operates to serve its purpose may be readily understood from the foregoing description. Placing a quantity of the honey-wax mixture in the supply hopper 10 results in the mixture being discharged at a suitably retarded rate into the upper end of the upper rotary screen 12. The rotation of the screen causes the wax content of the mixture to form a roll-shaped body that extends longitudinally to the discharge end of the screen. Since the wax body is of substantially less diameter than the inside diameter of the rotary screen 12, the roll-shaped body rotates on its own axis at a faster rate than the rotary screen but even this faster rate is relatively slow. For example, the mixture may be fed into a rotary screen approximately six inches in diameter at a rate to form a roll-like body approximately three inches in diameter and the six inch rotary screen may rotate at approximately 3 R. P. M. to cause the roll-shaped body to rotate on its own axis at approximately 6 R. P. M.

As the wax body rotates, honey is continually expressed or kneaded therefrom and the honey passes through the hardware cloth 49 and the perforated wall of the rotary screen to drop onto the upper drip pan or shield 66. Any particles of wax that flow out of the wax body along with the exuded honey are caught by the hardware cloth 46 and the rotating wax body picks up all such particles by adhesion so that the rotary screen operates in a self-cleaning manner.

The slight downward inclination of the rotary screen 12 causes the roll-shaped wax body to progress gradually longitudinally towards the rear discharge end of the rotary screen, the wax material following helical paths throughout the length of the rotary screen. As a result of the continuous extraction of honey from the rotating wax body the honey-wax ratio of the body progressively decreases. The wax body which still contains more than a desired proportion of honey breaks into pieces as it shifts out of the lower open end of the rotary screen 12 and these pieces fall into the transfer hopper 15 to move therefrom into the upper end of the lower rotary screen 14. The same extraction process continues in the lower rotary screen 14 to result in the formation of a second roller-shaped body of wax. By the time this second wax body reaches the discharge end of the lower rotary screen to drop into the receptacle means 16, it is free of honey to the desired degree. The clarified honey that drips from the upper rotary screen 12 falls upon the upper drip pan or shield 66 and flows to the downwardly inclined drip edges 72 to drop into the lower drip pan 20. Honey draining from the lower rotary screen 14 drops directly into the same lower drip pan 20. All of the honey flows to the discharge spout 78 of the lower drip pan and falls therefrom into the successive buckets 90 of the rotary actuator 18. As the successive buckets 90 reach the lower region of the rotary actuator they empty automatically into the hopper 92. The arrangement shown will cause each of the two rotary screens 12 and 14 to operate at approximately 3 R. P. M. in a typical practice of the invention. This rate may be varied.

My description in specific detail of the selected embodiment of the invention will suggest various changes, substitutions and other departures from my disclosure that properly lie within the spirit and scope of the appended claims.

I claim:

1. A method of separating wax from a wax-honey mixture which comprises placing a quantity of the wax-honey mixture in a hollow rotary screen of circular cross-sectional configuration and rotating the screen at a speed to cause the wax to form a single roll-shaped body of substantially less diameter than the inside diameter of the screen thereby to cause the wax body to rotate on its axis faster than the screen to express the honey out of the wax body for drainage through the screen and to cause the rotating wax body to pick up stray particles of wax from the inner surface of the screen.

2. A method as set forth in claim 1 which includes the step of deriving power from gravitational flow of the separated honey to rotate the screen member.

3. A method of separating wax from a wax-honey mixture which comprises placing a quantity of the mixture in a hollow rotary screen having an inclined under side and rotating the screen at a speed to cause the wax to form a single roll-shaped body and to cause the wax body to progress longitudinally and gradually by gravity to the lower end of said under side with consequent kneading of the honey out of the wax body for drainage through the screen with consequent progressive decrease in the ratio of honey to wax in the wax body and to cause the rotating wax body to continually pick up wax particles on the inner surface of the screen member by adhesion to maintain maximum capacity for honey flow through the wall of the screen member.

4. A method as set forth in claim 3 which includes the step of deriving power from the gravitational flow of the separated honey to rotate the screen member.

5. In an apparatus for separating wax from a wax-honey mixture, the combination of: a hollow screen member of circular cross-sectional configuration disposed in a generally horizontal direction with the bottom wall of the screen member sloping longitudinally from an input end of the screen member to an output end; means to rotate said screen member about a longitudinal axis therethrough at a rate to cause the wax therein to form a single roll-shaped body extending lengthwise in the screen member and rotating about its own axis at a faster rate than the screen member with the wax body gradually progressing by gravity to the output end of the cylinder, to cause honey to be expressed from the wax body for drainage through the wall of the screen member with consequent decrease in the ratio of honey to wax in the wax body in the direction of the output end of the screen member; and a rotary actuator operatively connected to said screen member to rotate it at a slow rate, said actuator being positioned below the level of said screen to receive honey separated by the screen member for actuation by gravitational movement of the honey.

6. An apparatus as set forth in claim 5 which includes means below said screen member to catch honey dripping therefrom and to direct the honey to the rotary actuator.

7. A combination as set forth in claim 6 which includes receptacle means below said rotary actuator to receive the separated honey.

8. An apparatus as set forth in claim 7 in which said rotary actuator is a bucket wheel.

9. A method of separating wax from a wax-honey mixture, said method comprising the steps of: placing a quantity of the wax-honey mixture in a hollow rotary screen, and rotating the screen at a speed to cause said mixture to form a single roll-shaped body, whereby honey may be expressed from said roll-shaped body by the weight of the body itself.

10. A method of separating wax from a honey-wax mixture, said method comprising the steps of: continuously depositing the wax-honey mixture in a hollow rotatable screen, and rotating the screen at a speed to cause said mixture to form a single roll-shaped body, whereby honey may be expressed from said roll-shaped body by the weight of the body itself.

11. A method of separating wax from a honey-wax mixture, said method comprising the steps of: continuously depositing the wax-honey mixture in a hollow rotatable screen, and rotating the screen.

12. A method of separating wax from a wax-honey mixture, said method comprising the steps of: depositing the wax-honey mixture in a hollow rotatable screen, and rotating the screen.

References Cited in the file of this patent

UNITED STATES PATENTS

| | | |
|---|---|---|
| 292,947 | Porter | Feb. 5, 1884 |
| 869,720 | Matthias | Oct. 29, 1907 |
| 2,206,593 | Beebe | July 2, 1940 |
| 2,228,185 | Thompson | Jan. 7, 1941 |
| 2,342,321 | Adams | Feb. 22, 1944 |
| 2,536,054 | Harrington | Jan. 2, 1951 |